United States Patent [19]
Ament

[11] Patent Number: 6,016,899
[45] Date of Patent: Jan. 25, 2000

[54] CLUTCH DISK WITH FLEXIBLE BEARING

[75] Inventor: Norbert Ament, Oerlenbach, Germany

[73] Assignee: Mannesmann Sachs AG, Schweinfurt, Germany

[21] Appl. No.: 08/989,974

[22] Filed: Dec. 12, 1997

[30]     Foreign Application Priority Data

Dec. 14, 1996 [DE] Germany ............................ 196 52 104

[51] Int. Cl.⁷ .................................................... F16D 13/64
[52] U.S. Cl. ................. 192/204; 192/213.12; 192/214.1; 464/68
[58] Field of Search ..................................... 192/204, 212, 192/213.12, 213.22, 213.31, 214.1, 70.17; 464/68

[56]              References Cited

U.S. PATENT DOCUMENTS

| 5,582,280 | 12/1996 | Schneider et al. ................... | 192/70.17 |
| 5,711,407 | 1/1998 | Maier .............................. | 192/213.12 X |

FOREIGN PATENT DOCUMENTS

| 39 21 283 | 8/1990 | Germany. |
| 33 40 896 | 7/1992 | Germany. |
| 196 32 086 | 2/1997 | Germany. |
| 195 42 514 | 5/1997 | Germany. |
| 2 149 476 | 6/1985 | United Kingdom. |
| 2 152 634 | 8/1985 | United Kingdom. |
| 2 307 291 | 5/1997 | United Kingdom. |

*Primary Examiner*—Richard M. Lorence
*Attorney, Agent, or Firm*—Cohen, Pontani, Lieberman & Pavane

[57]              ABSTRACT

A clutch disk for a motor vehicle, in which a centering force is applied between the input parts and the output parts in operating states in which the input parts, relative to the output parts, carry out a wobbling movement or undergo a radial displacement, a spring element arranged between one cover plate and the hub disk and which is centered directly or indirectly at the cover plate or hub disk. A bearing ring is arranged with an outer contour between the spring tongues and the bearing region of the hub. The inner contour of a structural component part of the one coverplate is arranged at a distance from this outer contour for determining the movement play of the spring tongues of the spring element.

14 Claims, 8 Drawing Sheets

CLUTCH DISK WITH FLEXIBLE BEARING

BACKGROUND OF THE INVENTION

1. Field of the Invention

The invention is directed to a clutch disk for a friction clutch in motor vehicles. More specifically, the invention is directed to a clutch disk having a flexible bearing.

2. Description of the Related Art

A clutch disk of this construction type is known from the German Patent 33 40 896. In this construction type, a spring element is provided which enables a certain radial elasticity or flexibility between the two cover plates and the hub.

SUMMARY OF THE INVENTION

It is the object of the present invention to provide an improved clutch disk having radial elasticity as well as the possibility of a tilting movement, wherein a uniform and low friction is achieved during torsional vibrations and the operability of the clutch disk is preserved over a long time period.

According to the invention, a clutch disk includes a hub having a load damper hub disk that is fixedly rotatably connectable to a gearshaft. The hub is surrounded by two cover plates which are fixedly connected to each other at a location remote from the hub. A spring element with an annular disk-shaped region is centered directly or indirectly with respect to either the cover plates or the load damper hub disk. A bearing ring is arranged between spring tongues of the spring element and a bearing area of the hub. The bearing ring has an outer contour on which the spring tongues of the spring element rest by their inner contour in the rest or neutral position of the clutch disk. The spring tongues may be partially pretensioned or may have no pretensioning. The spring tongues themselves form an outer contour on the side of the hub located opposite to the outer contour of the bearing ring. The inner contour of a structural component part which corresponds with one of the cover plates, at least in the axial direction, forms a gap adjacent to the outer contour formed by the spring tongues. The freedom of movement of the spring element is exactly predetermined by the size of the gap provided in the neutral position of the clutch, so that an overloading of the spring element is prevented. Further, the bearing ring positioned between the spring tongues and the bearing region of the hub ensures that the friction occurring during the rotation of the input parts and output parts of the clutch disk is not subject to any major fluctuations.

The spring element is centered at the cover plate. The centering of the spring element at the cover plate achieves particularly good results with respect to the radial elasticity between the cover plates and the hub. At the same time, a wobbling movement of the cover plate may occur which, like the radial flexibility, is stabilized by the elasticity of the spring tongues.

According to a further feature of the invention, the spring element rests directly on the inner side of the cover plate by its annular disk-shaped region and engages corresponding openings of the cover plate with a plurality of tongues which extend diagonally along a circumference of the spring element to effect a centering. This embodiment is particularly simple to construct.

According to another feature, a counter-contour is formed directly by a part of the radial inner region of one of the cover plates. Accordingly, the radial inner region of the cover plate itself assumes the function of limiting the path of the spring element and determines the size of the gap in the neutral position of the clutch disk.

However, the spring element may optionally be centered indirectly relative to the cover plate by using a plastic ring which is centered at the cover plate. In this embodiment, the spring element is centered within the plastic ring, which is inserted between the inner side of the cover plate and the annular disk-shaped region of the spring element. The counter-contour is formed by the radial inner region of the plastic ring. This construction enables a very exact production of the counter-contour for the spring element and ensures a slight friction which can be proportioned in the event of relative movement between the plastic ring and the spring element.

In a further embodiment for clutch disks which includes a no-load damper or idling damper axially arranged between the load damper hub disk and cover plate, an idling hub disk is rotatably fixedly arranged on the hub. At least one idling cover plate is centered at and axially supported at the load damper hub disk. Idling springs are arranged in windows of the idling hub disk and the idling cover plate, and a toothing connection element is disposed with play between the load damper hub disk and the hub. This embodiment further comprises a load friction device which is acted upon by a separate spring and whose force is formed at least over the two cover plates and over the at least one idling cover plate, the load damper hub disk, and a region of a friction ring. In this way, the advantages of the centering effect of the spring element can also be applied in clutch disks which have an idling damper.

In a further feature, the friction ring is constructed, at the same time, as portion of the plastic ring with the counter-contour arranged in its radially inner region. Accordingly, the plastic ring also simultaneously assumes the function of the friction ring for the load friction device.

However, it is also possible and, in particular cases, advantageous that the spring element is centered directly or indirectly at the load damper hub disk over the outer diameter of its annular disk-shaped area. In such a case, the spring element contributes slightly to the radial elasticity of the clutch disk.

When using an idling damper that is positioned axially between the load damper hub disk and one of the two cover plates, and the idling damper hub disk is rotatably fixed relative to the hub, at least one idling cover plate is centered at and supported axially at the idling hub disk. Springs are inserted in windows at the at least one idling cover plate and idling hub disk and a toothing connection element with play is mounted between the load damper hub disk and the hub. A plastic ring is optionally inserted between the inner side of one of the two cover plates and the annular disk-shaped region of the spring element. The spring element is centered at this plastic ring, and the plastic ring is in turn centered at the idling cover plate. As a result of this construction, the plastic ring is centered at the load damper hub disk indirectly by the spring element which is centered at the plastic ring. In this way, the counter-contour for the spring tongues of the spring element is formed by the radial inner region of the plastic ring. This counter-contour forms a path limitation for the elastic flexibility between the hub and the cover plates with the friction facings.

According to yet another embodiment, a basic friction device comprises a friction ring and a friction device spring. The friction ring is arranged between the end face of the toothing connection element of the hub and the one of the two cover plates of the load damper arranged on the side of the hub disk remote from the idling damper. The friction device spring generates contact pressure force between the friction ring and toothing connection element. This basic friction device can be adjusted with respect to its friction force independently from the load friction device and provides for a low, uniform friction force, especially in the effective area of the idling damper. In so doing, the friction element spring fixes the spring element whose annular disk-shaped region lies in the axial flow of force of the friction device spring.

For this purpose, the friction device spring can be arranged between one of the cover plates of the load damper and the friction ring.

However, the toothed connection element of the hub is optionally stepped in its outer diameter such that the toothed connection element includes a reduced diameter region and a greater diameter region. In this embodiment, the idling hub disk is rotatably fixedly attached in the reduced diameter region of the toothed connection element and having an axial play. The friction device spring is positioned at the reduced diameter of the toothing connection element and guided axially between the idling hub disk and the greater diameter region of the toothed connection element. A construction of this kind is also easy to assemble; it fixes the axial position of the idling hub disk while nevertheless enabling a certain adaptation of the hub disk during wobbling movements.

In the following, the invention is explained more fully with reference to a number of embodiment examples.

BRIEF DESCRIPTION OF THE DRAWINGS

In the drawings:

FIG. 2a shows a plan view of a spring element;

FIG. 2b shows a sectional view of the spring element of FIG. 2a;

DETAILED DESCRIPTION OF THE PRESENTLY PREFERRED EMBODIMENTS

Figures 1, 1A:
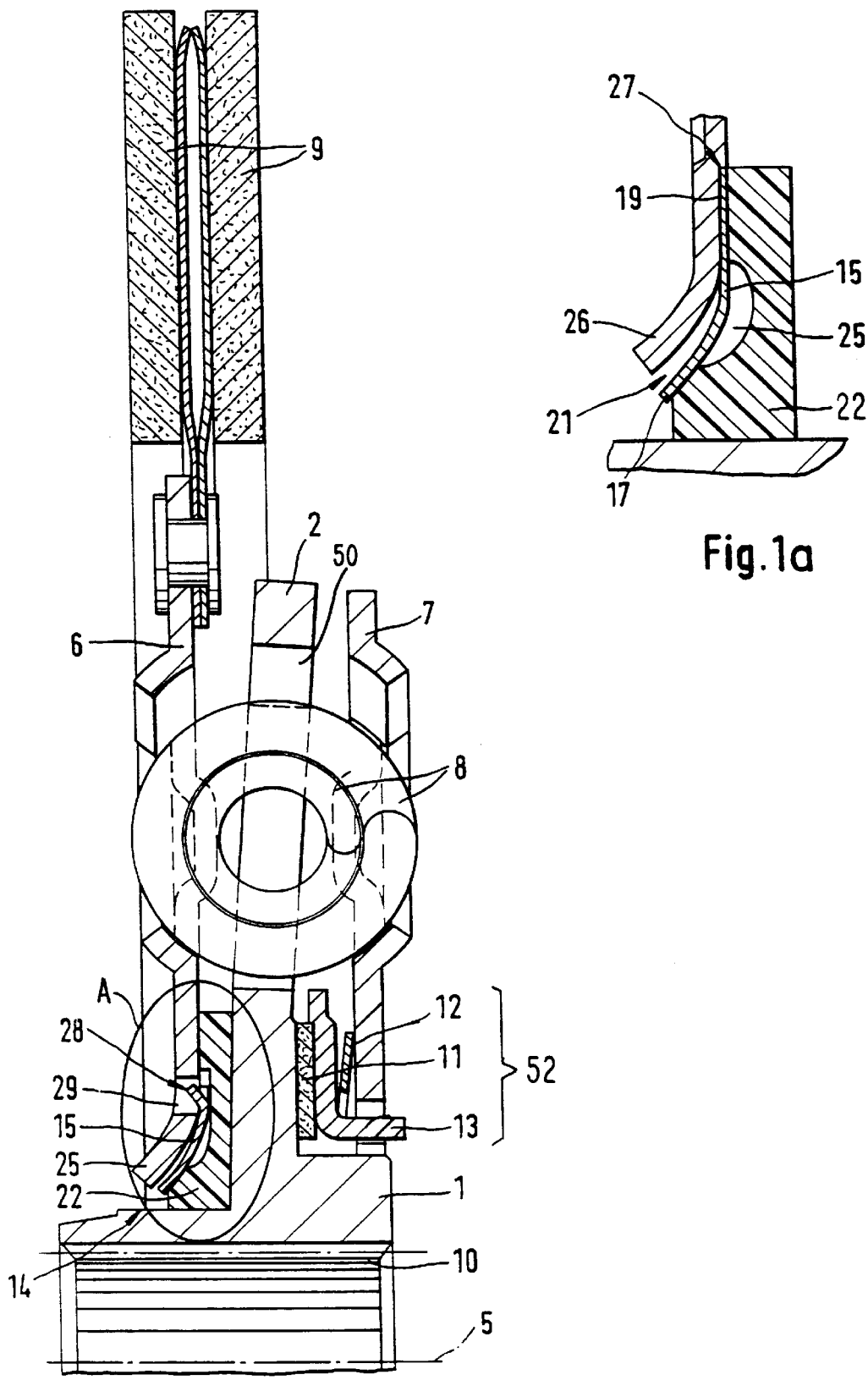
FIG. 1 shows a longitudinal section through the upper half of a clutch disk.
FIG. 1a is an enlarged view of a section A shown in FIG. 1 showing another embodiment of a clutch disk.

The clutch disk shown in FIG. 1, with an enlarged detail A shown in FIG. 1a, includes a hub 1 which has an inner toothing 10. The inner toothing 10 of the hub 1 is placeable on a gear shaft, not shown, so that the hub 1 is rotatably fixed relative to it. An axis of rotation 5 of the gearshaft and the hub 1 is shown at the bottom of FIG. 1. The hub 1 includes a hub disk 2 which extends radially outward and has openings 50 in which springs 8 are arranged substantially tangentially around the axis of rotation 5. Extending along both sides of the hub disk 2 are cover plates 6 and 7 which are fixedly connected with one another at a distance by spacer rivets (not shown in this view). The cover plate 6 has facing support elements with friction facings 9 in an outer radial area. A cylindrical bearing area 14 is arranged on hub 1 radially inside the springs 8 and along a side of the hub disk 2 of the hub 1. A bearing ring 22 of plastic is radially guidably movable in this cylindrical bearing area 14. The bearing ring 22 is axially clamped between a radial inner region of the cover plate 6 and the hub disk 2. This clamping is effected by elements of a friction device 52 which are arranged on the opposite side of the hub disk 2. These elements, proceeding from the hub disk 2, comprise a friction ring 11, a pressure ring 13, and a spring 12. The pressure ring 13 engages the cover plate 7 such that it is rotatably fixed, but axially displaceable, relative to the cover plate 7. In this embodiment, the relative movement for generating friction takes place between the pressure ring 13 and the hub disk 2 with friction ring 11 interposed between them. It is also possible, in principle, to arrange the pressure ring 13 in the hub disk 2 such that it is rotatably fixed axially displaceable relative to it. In this configuration, the spring 12 is arranged between the pressure ring 13 and hub disk 2, and the friction ring 11 is arranged between the pressure ring 13 and the cover plate 7.

Both cover plates 6 and 7 are rotatable relative to the hub disk 1 against the force of the springs 8. In addition, both cover plates 6 and 7 are displaceable radially to a certain extent, allowing certain wobbling movements. For allowing wobbling movements, the cover plate 6 is inclined at its radial inner region 26 such that the radial inner region 26 of cover plate 6 faces away from the hub disk 2. A spring element 15 is arranged at the radial inner region 26. The spring 15 has an annular disk-shaped region 19 extending axially between the bearing ring 22 and the radial inner region 26 of the cover plate 6. The spring 15 also has spring tongues 17 extending radially inward and at an inclination such that they face away from the hub disk 2. In the neutral state of the clutch disk shown in FIG. 1, these spring tongues 17 rest on an outer contour of the bearing ring 22 and are preferably pretensioned such that the spring 15 produces a centering effect between the cover plates 6 and 7 and the hub 1. As can be seen more clearly in the adjacent enlarged view of FIG. 1a, a gap 21 is formed in the neutral state between the outer contour of the spring tongues 17 and the inner contour of the radial inner region 26 of the cover plate 6. The gap 21, which extends circumferentially and is concentric to the axis of rotation 5, imposes a path limitation on the relative displacement between the cover plates 6 and 7 and the hub 1. This path limitation prevents overloading of the spring tongues 17.

The bearing ring 22 further serves as part of the friction device 52 in that the pretensioning force of the springs 12 is supported by the two cover plates 6 and 7 and the radially outer region of the bearing ring 22. For this purpose, a radially outer portion of the spring element 15 is arranged between the inner side of the cover plate 6 and a cut out portion in the bearing ring 22. The bearing ring 22 is also provided with a circumferential recess 25 (see also the adjacent detailed view of FIG. 1a) such that the spring tongues 17 of the spring element 15 neatly contact the outer contour of the bearing ring 22 at least in the neutral state of the clutch disk.

The spring element 15 is also provided with axially inclined tongues 28 which engage corresponding openings 29 of the cover plate 6 such that the spring element 15 and the cover plate 6 are rotatably fixed relative to one another.

In the case of a radial displacement between the friction facings 9 and the hub 1, which, for example, could be caused by a misalignment of the rotational axes of the engine and gear shaft, both cover plates 6 and 7 move radially over the hub 1, so that the spring element 15 is pretensioned, in that it is loaded by the corresponding spring tongues 17, and exerts a corresponding centering force to the cover plates 6 and 7. The same situation occurs in the event of an externally forced inclined state, which, for example, could be caused by a misalignment of the axes of the crankshaft of the engine and the axis of rotation 5 of the gear shaft.

In the partial section shown in FIG. 1a, the radial centering of the spring element 15 is effected along its outer diameter of the annular disk-shaped region 19 and a centering edge 27 which directly contacts the cover plate 6. The bearing ring 22 forms, in its radial inner region, a conical outer contour on which the spring tongues 17 are supported in a springing manner in the neutral state of the clutch disk. A recess 25 is provided between this region of the bearing ring 22 and its radial outer region in order to definitely define the contact of the spring tongues 17.

Figures 2A, 2B:
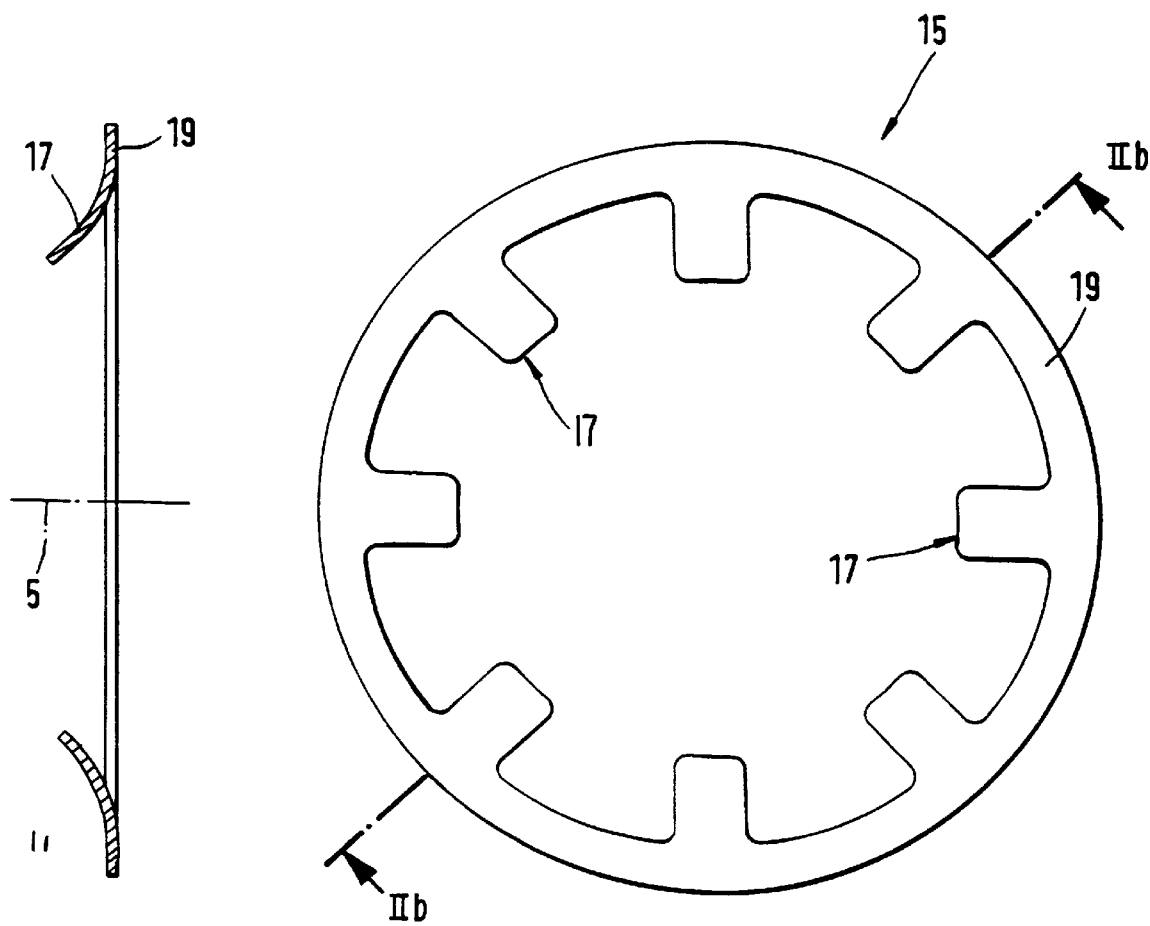
Figures 2C, 2D:
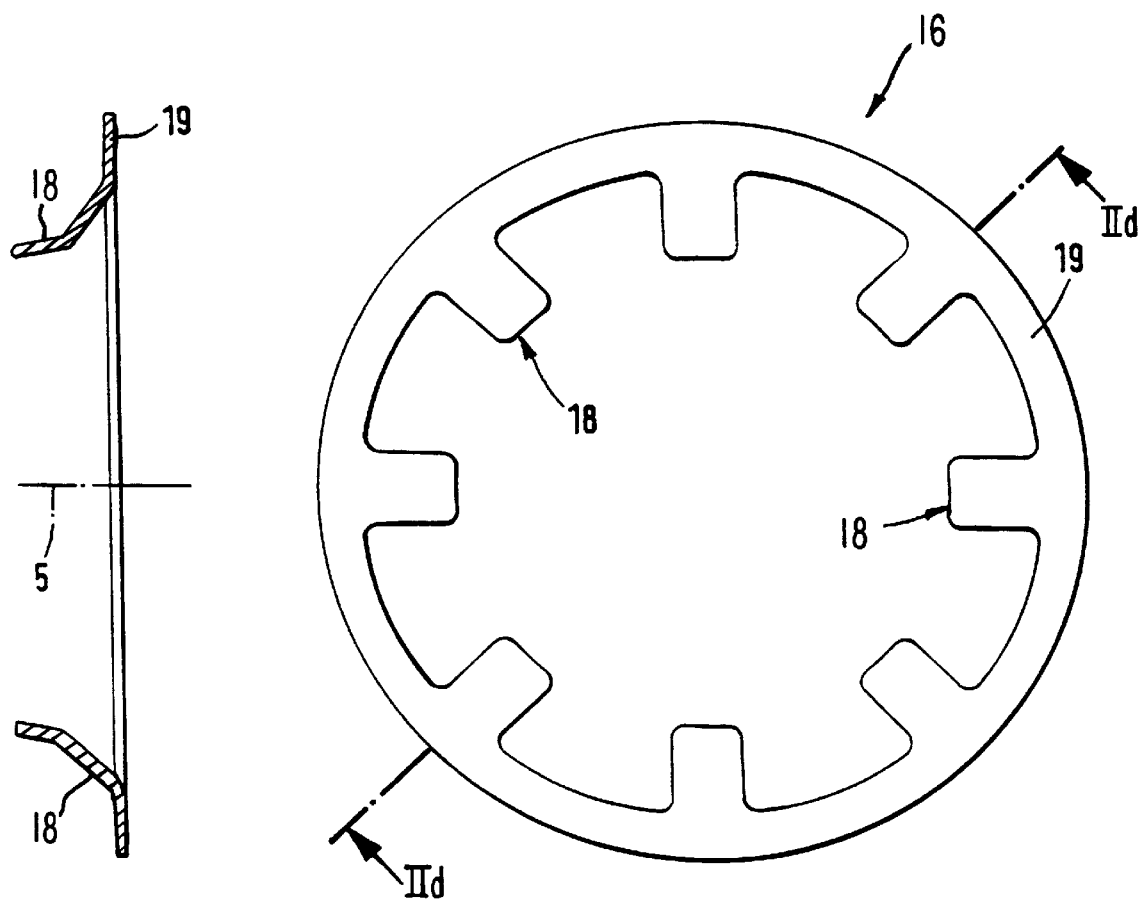
FIG. 2c shows a plan view of another embodiment of a spring element.
FIG. 2d shows a sectional view of the spring element of FIG. 2c.

FIGS. 2a and 2b show a plan view and a longitudinal section of a spring element 15 and FIGS. 2c and 2d show a plan view and a longitudinal section of a spring element 16. These two different embodiment forms are practically indistinguishable from one another when viewed from the front as in FIGS. 2a and 2c. Spring elements 15 and 16 each have a circumferentially extending, annular disk-shaped region 19 from which a plurality of spring tongues 17, 18, respectively, project away at an inclination radially inward. Spring tongues 17 of spring 15 are inclined and so constructed such that they generate an axial force component in addition to the radial centering force. Spring tongues 18 corresponding to spring 16 are constructed such that their ends extend substantially concentrically to the rotational axis 5. The spring tongues 18 of the spring element 16 only exert a radial pretensioning force (as will be explained more fully in subsequent examples).

Figure 3:
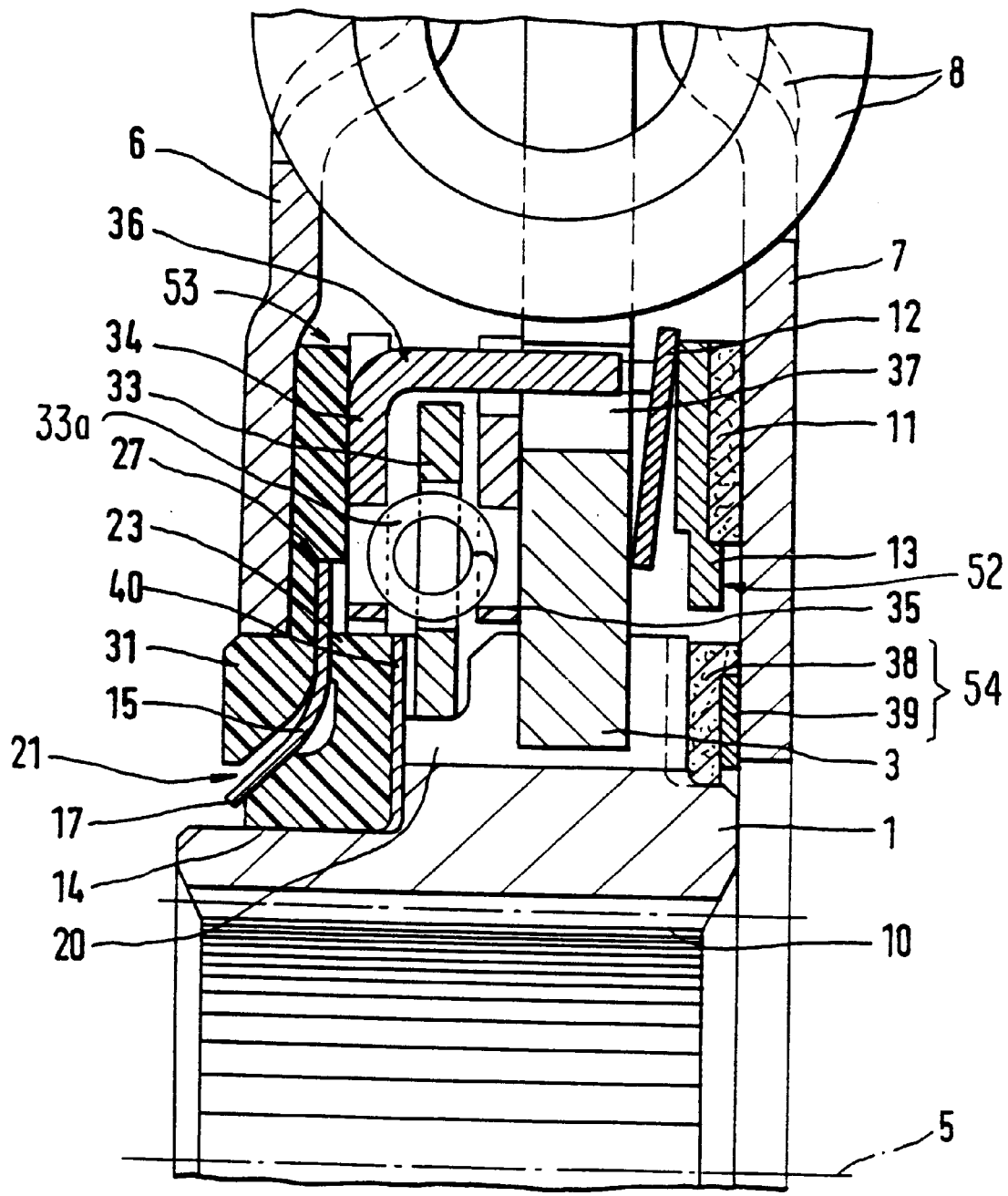
FIG. 3 shows a partial section of a clutch disk with idling damper.

Referring now to FIG. 3, a clutch disk with a load damper and an idling damper is shown in which the hub 1 is arranged concentrically to the axis of rotation 5 and has an inner toothing 10 for a rotatably fixed connection on a gear shaft, not shown. The hub 1 has a radially outer side with a toothing 20 which, in the present case, is stepped along its axial extension. A hub disk 3 engages an area of the toothing 20 having the greatest diameter. The toothing 20 includes a circumferential play that defines an effective area of the idling damper. Two cover plates 6 and 7 are connected with one another so as to be rotatably fixed with relative to one another and held at a distance from one another. The cover plates are parallel to the radial extension of the hub disk 3. In a known manner, the springs 8 are arranged as part of the load damper, in openings in the cover plates 6 and 7 and the hub disk 3. The structural component parts of the idling damper, among others, are arranged between the hub disk 3 and the cover plate 6. In the present case, these structural component parts of the idling damper or idling friction device 53 comprise a hub disk 33 and cover plates 34 and 35. The hub disk 33 is placed on the reduced diameter portion of the toothing 20 so that it is rotatably fixed with respect to rotation relative thereto, and is preferably, but not necessarily free to move axially. Cover plates 34 and 35 are arranged at both sides of this hub disk 33. Springs 33a are provided between these two groups of structural component parts in the same basic arrangement as springs 8. The cover plate 34, arranged at a distance from the hub disk 3, has axially projecting tabs 36 arranged the circumference of cover plate 34. These tabs 36 engage openings 37 of the hub disk 3 so as to be rotatably fixed relative thereto and are also supported axially at the hub disk 3 in this area. The cover plate 35 located on the inside is also arranged so as to be rotatably fixed relative to this tab 36. Cover plates 34 and 35 are rotatably fixed and axially movable relative to each other.

A plastic ring 31 is centered in the cover plate 6 and arranged axially between cover plate 34 and the inner wall of cover plate 6. This plastic ring 31 is situated within the force support of the load friction device 52 arranged on the side of the hub disk 3 located opposite to the idling damper. The load friction device 52 comprises the spring 12, the pressure ring 13 and the friction ring 11. In the present case, the pressure ring 13 is arranged, via axially projecting tabs, not identified by reference numbers, at the hub disk 3 so as to be rotatably fixed relative to it, but is supported so as to be axially displaceable. The spring 12 is arranged between the pressure ring 13 and the hub disk 3. The friction ring 11 is located between the pressure ring 13 and the inner side of the cover plate 7. The friction force applied by the spring 12 is transmitted via the pressure ring 13, the friction ring 11, cover plate 7, cover plate 6, the plastic ring 31, cover plate 34, and tabs 36 to the hub disk 3 and accordingly to the spring 12.

On the side of the toothing 20, a bearing ring 23 is mounted on the hub 1 on a concentric bearing region 14. The spring tongues 17 of the spring element 15 are supported on the bearing ring 23 in the neutral state of the clutch disk. The axially diagonally extending spring tongues 17 are supported on a corresponding outer contour of the bearing ring 23 in the manner described above. The radial outer region of the spring element 15 is centered in a centering edge 27 in the plastic ring 31. The annular disk-shaped region 19 of the spring element 15 is axially held between a contour of the bearing ring 23 arranged at the radial outer side and a correspondingly substantially radially extending region of the plastic ring 31. A disk 40 is arranged between the bearing ring 23 and the front end of the toothing 20 for determining the extent of the axial movability of the hub disk 33 of the idling damper. The disk 40 may comprise a material which promotes sliding on the side of the hub disk 33 to reduce friction between the hub disk 33 of the idling damper. Further, a friction ring 38 and a spring 39 are part of a basic friction device 54 arranged on the side of the hub 1 opposing the bearing ring 23 at the front end of the toothing 20. The spring 39 axially urges bearing ring 23 into contact at the front end of the toothing 20 for the purpose of axially securing the hub 1 and the cover plates 6 and 7. By means of this construction, the friction force for the load friction device 52 can be adjusted independently from the friction force for the idling frictional device 53 or basic friction device 54. Further, it can be seen that in the neutral position shown in FIG. 3, that a gap 21 exists between the outer contour of the spring tongues 17 and the inner contour of the plastic ring 31. The gap 21 limits the amount of possible radial deflection between the cover plates 6 and 7 and the hub 1.

When torsional movements occur in the region of the idling damper, no relative movement between the parts of the load friction device 52 occurs. In this case, only the idling friction device 53 is active and the idling springs 33a are acted upon. In this respect, a relative movement takes place between the cover plate 7 and the hub 1, so that friction is generated in the region of the friction ring 38. The same is true on the opposite side of the hub disk 3, where in this case, the relative movement takes place between the hub 1 and the cover plate 6 and the friction surface, in accordance with the friction resistance which was just in effect, occurs between the hub 1 and the bearing ring 23, between the bearing ring 23 and spring element 15, or between the spring element 15 and the plastic ring 31. The plastic ring 31, since it is clamped in the path of force of the load friction device 52, is considered in this operating state to be fixed with respect to rotation relative to the cover plate 6. Nevertheless, it is possible to connect the plastic ring 31 with the cover plate 6 in a positive engagement. During wobbling movements or radial displacement between the cover plates 6 and 7 and the hub 1, the spring tongues 17 of the spring element 15 are elastically deformed and exert a restoring force on the two displaced structural component parts to produce a centered position again immediately.

Figure 4:
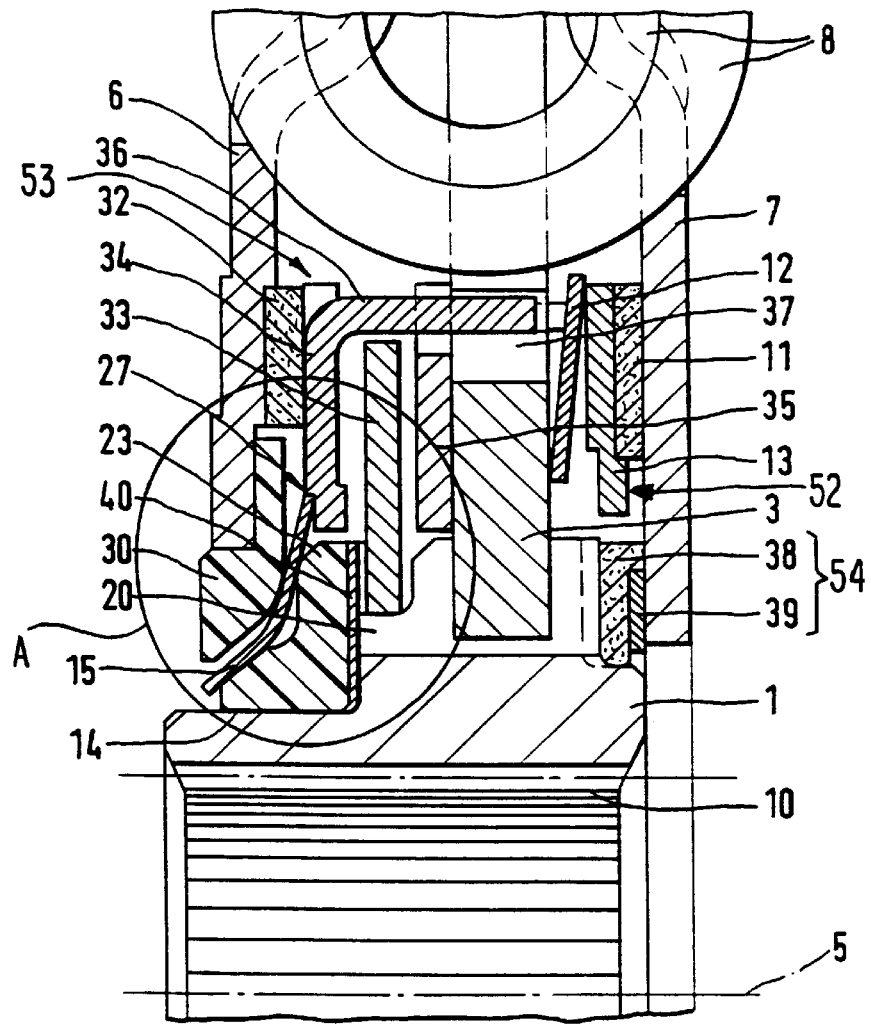
FIG. 4 shows a partial section of clutch disks with idling dampers which is a variant of FIG. 3.

In FIG. 4, a clutch disk similar to that of FIG. 3 is shown. Therefore, only the differences between the two constructions will be discussed in the following. Identical structural component parts are provided with identical reference numbers. The essential difference with respect to FIG. 3, is that the spring element 15 is centered indirectly at the hub disk 3 of the load damper. That is, the outer diameter of the spring element 15 is guided in a centering edge 27 of the cover plate 34 of the idling damper 53. The tabs 36 of the cover plate 34 engage corresponding openings 37 of the hub disk 3, such that cover plate 34 is rotatably fixed relative to hub disk 3 and is axially supported. The rotatably fixed connection is also the centering means acting in the radial direction. A plastic ring 30 in the cover plate 6 is constructed and positioned such that the plastic ring 30 lies outside of the region of the clamping force of the load friction device 52. Instead, a separate friction ring 32 receives the clamping force. This friction ring 32 is axially clamped between cover plate 34 and cover plate 6. The remaining structural component parts correspond to those shown in FIG. 3.

The action of this construction is comparable with that of the construction in FIG. 3 with respect to a wobbling movement. However, the embodiment of FIG. 4 differs from the latter with respect to radial displacement insofar as the radial displaceability between the hub disk 3 and the hub 1 is limited by the toothing 20. Also, the spring element 15 is loaded in the region of this displaceability via its spring tongues 17 and exerts a centering force. This centering effect is transmitted via the hub disk 3 to the springs 8 and the cover plates 6 and 7.

Figure 4A:
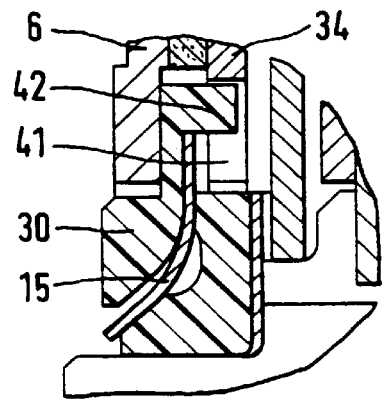
FIG. 4a is an enlarged view of a section A shown in FIG. 4 showing another embodiment of a clutch disk.

The sectional view in FIG. 4a shows a variant in which the spring element 15 is centered, in the region of its outer diameter, indirectly at the cover plate 34 of the idling damper. The centering is effected in FIG. 4a as follows. The plastic ring 30 is guided in the radial inner region of the cover plate 6 such that it is radially and circumferentially displaceable. Axially projecting protuberances 42 of plastic ring 30 also engage in a centering manner in corresponding openings 41 of the cover plate 34. The cover plate 34 itself is centered at the hub disk 3 of the load damper corresponding to the above descriptions. The manner of operation corresponds to that shown in FIG. 4.

Figure 5:
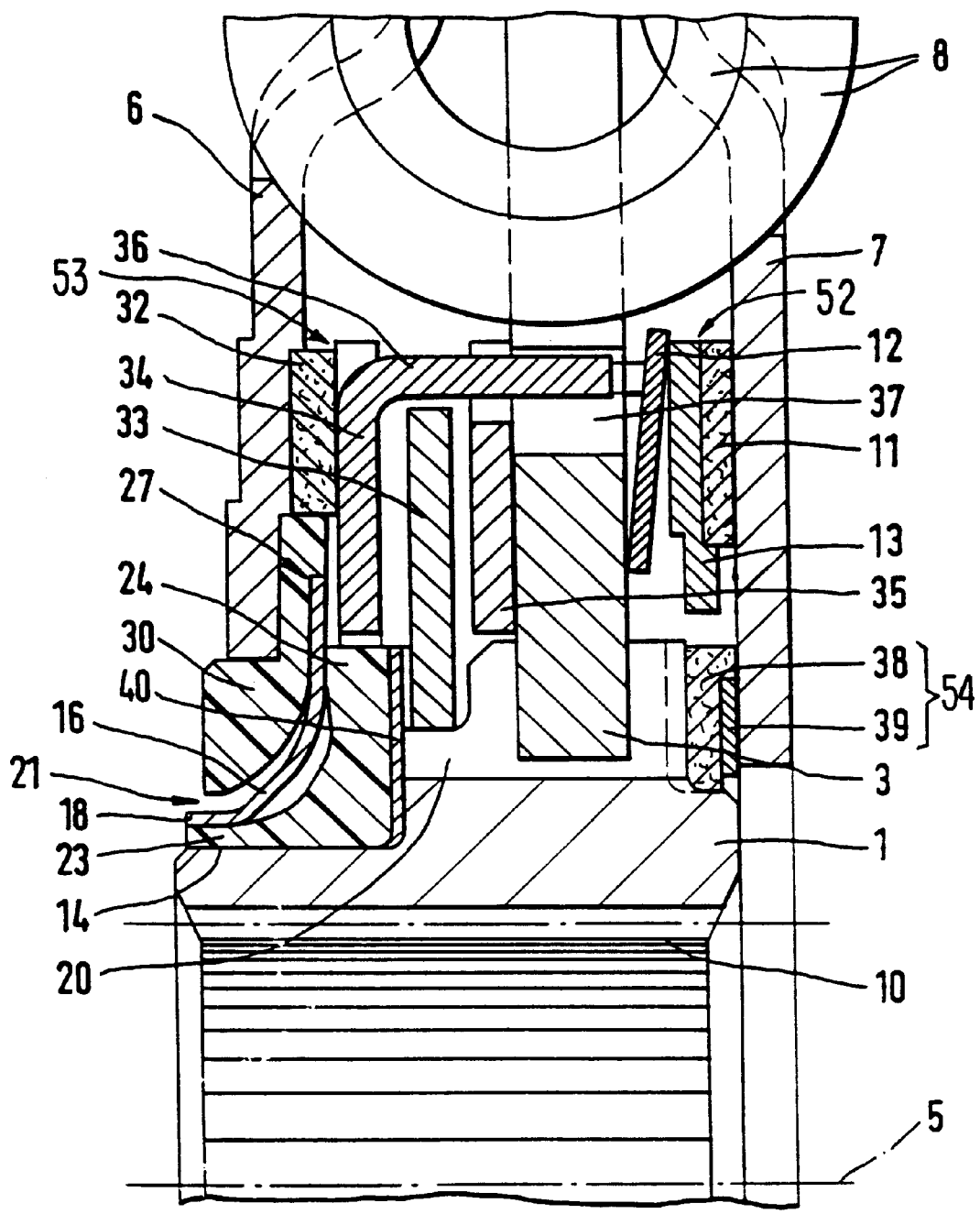
FIG. 5 shows a partial section of clutch disks with idling dampers which is a variant of FIG. 3.

FIG. 5 shows another variant of the previous Figures in which another type of spring element 16 is used. This spring element 16 includes spring tongues 18 which extend substantially concentric to the axis of rotation 5 in their end regions and thus exert a purely radially centering force. For this purpose, a bearing ring 23 is arranged on the hub 1. The bearing ring 23 has an outer contour which takes into account this purely radial support of the spring tongues 18. In a region of the bearing ring 23 that is most axially remote from the toothing 20, the bearing ring 23 is also concentric to the axis of rotation 5 and cylindrical. In addition, the plastic ring 30 is centered in the cover plate 6 and the spring element 16 is centered in the region of its outer circumference at a centering edge 27 of the plastic ring 30. The remainder of the structural component parts substantially conform to the construction according to FIG. 4, that is, the plastic ring 30 is arranged outside of the force support of the load friction device 52 so that it is independent therefrom.

Figure 6:
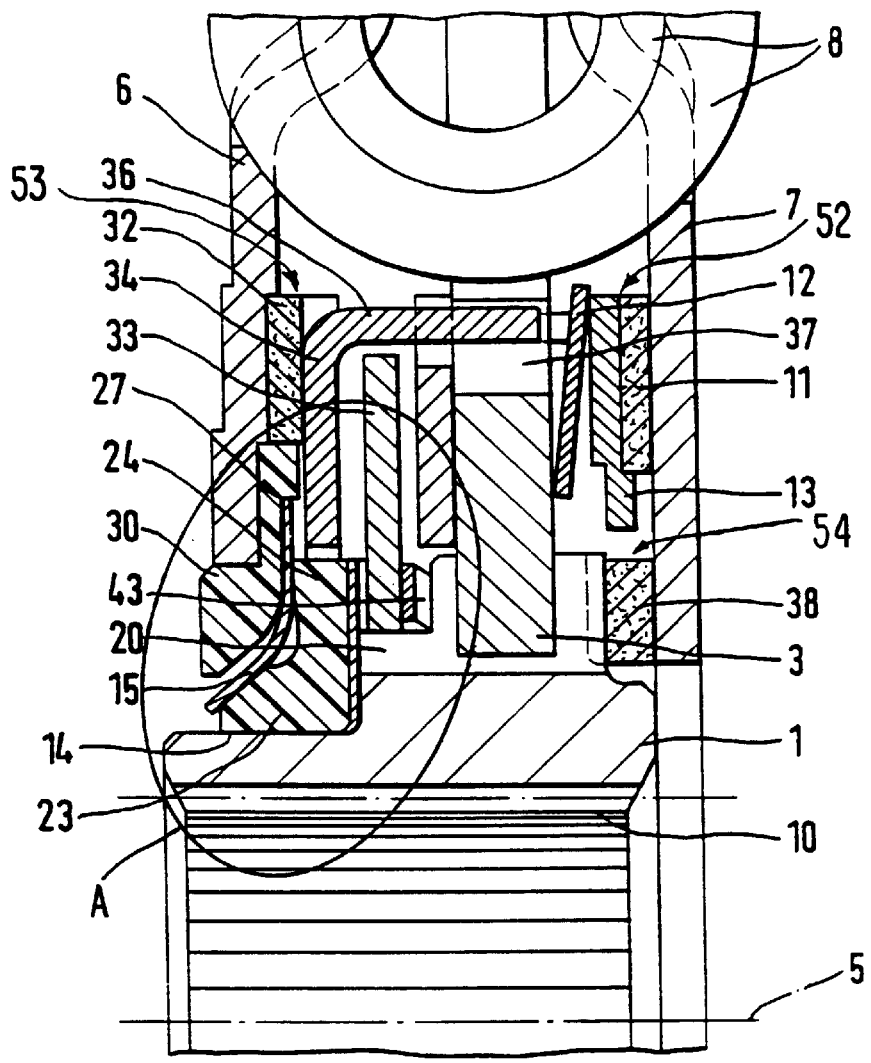
FIG. 6 shows a partial section of clutch disks with idling dampers which is a variant of FIG. 3.
Figure 6A:
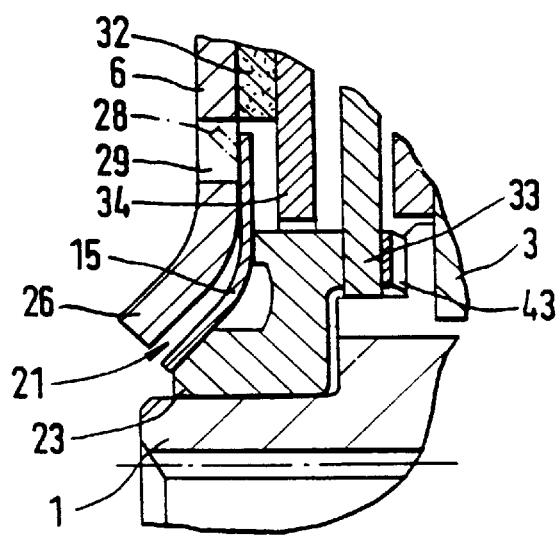
FIG. 6a is an enlarged view of a section A shown in FIG. 6 showing another embodiment of a clutch disk.

Referring now to FIGS. 6 and 6a, another embodiment of clutch disk is shown which differs from the construction according to FIG. 3 in that, for one, a separate friction ring 32 generates the frictional force of the load friction, so that the plastic ring 30 in which the spring element 15 is centered, is arranged outside of the force path of the load friction device. Further, the position of a spring 43 for generating the basic frictional force is shifted in this construction into the interior of the idling damper 53 (compared to FIG. 3). The spring 43 is located between the axially loosely arranged hub disk 33 of the idling damper 53 and a shoulder in the stepped toothing 20. The toothing 20 is connected in its large diameter region with the hub disk 3 such that it is rotatably fixed relative to it and is connected in its small diameter region with the hub disk 33 such that it is also rotatably fixed relative to it. The friction ring 38 is accordingly inserted directly between the inner wall of the cover plate 7 and an axial end of the toothing 20. The friction ring 38 may be fixedly connected, as also in the case of the embodiment of FIG. 3, with the axial end of toothing 20 so that it does not rotate relative to the hub 1. Further, the bearing ring 23 is axially supported on the hub disk 33 and therefore does not contact the front end of the toothing 20 in the axial direction to support the spring tongues of the spring element 15. In the unloaded state of the clutch disk, the spring 43 accordingly generates contact between the cover plate 7, the friction ring 38 and the front end of the toothing 20 which directly contacts the friction ring 38. On the side of the friction ring 38 located opposite the hub disk 3, the spring 43 is supported at the shoulder of the toothing 20 and at the inner side of the hub disk 33. The supporting force is transmitted via the bearing ring 23 and the spring element 15 to the plastic ring 30 and the cover plate 6. The friction force for the basic friction device 54 can accordingly be adjusted and adapted so as to be completely independent from the friction force for the load damper 52.

The partial view of the region around the bearing ring 23 shown in FIG. 6a shows a variant in which, corresponding to FIG. 1, the radial inner region 26 of the cover plate 6 is constructed substantially conically to define the gap 21 which is provided opposite from the spring tongues of the spring element 15, in the neutral state of the clutch disk. At the same time, the spring element 15 is arranged so as to contact the inner side of the cover plate 6 and is fixed therewith so as to be rigidly fixed against rotation therewith, wherein this is effected by tongues 28 which engage corresponding openings 29 of the cover plate 6 which provide a fixed connection with respect to relative rotation and a centering at the same time. Also in the present case the bearing ring 23 rests directly on one side of the hub disk 33 of the idling damper 53. The bearing ring is acted upon axially by the spring 43 which contacts the other side of the hub disk 33 and is supported at the end face of the step of hub 1 formed by the difference in diameter between the arrangement of hub disk 3 and hub disk 33. The load friction device acts on the side of the cover plate 6 directly via the friction ring 32 between the cover plate 34 of the idling damper 53 and the cover plate 6 of the load damper 52. The spring element 15 is accordingly independent from this generation of frictional force.

Figure 7:
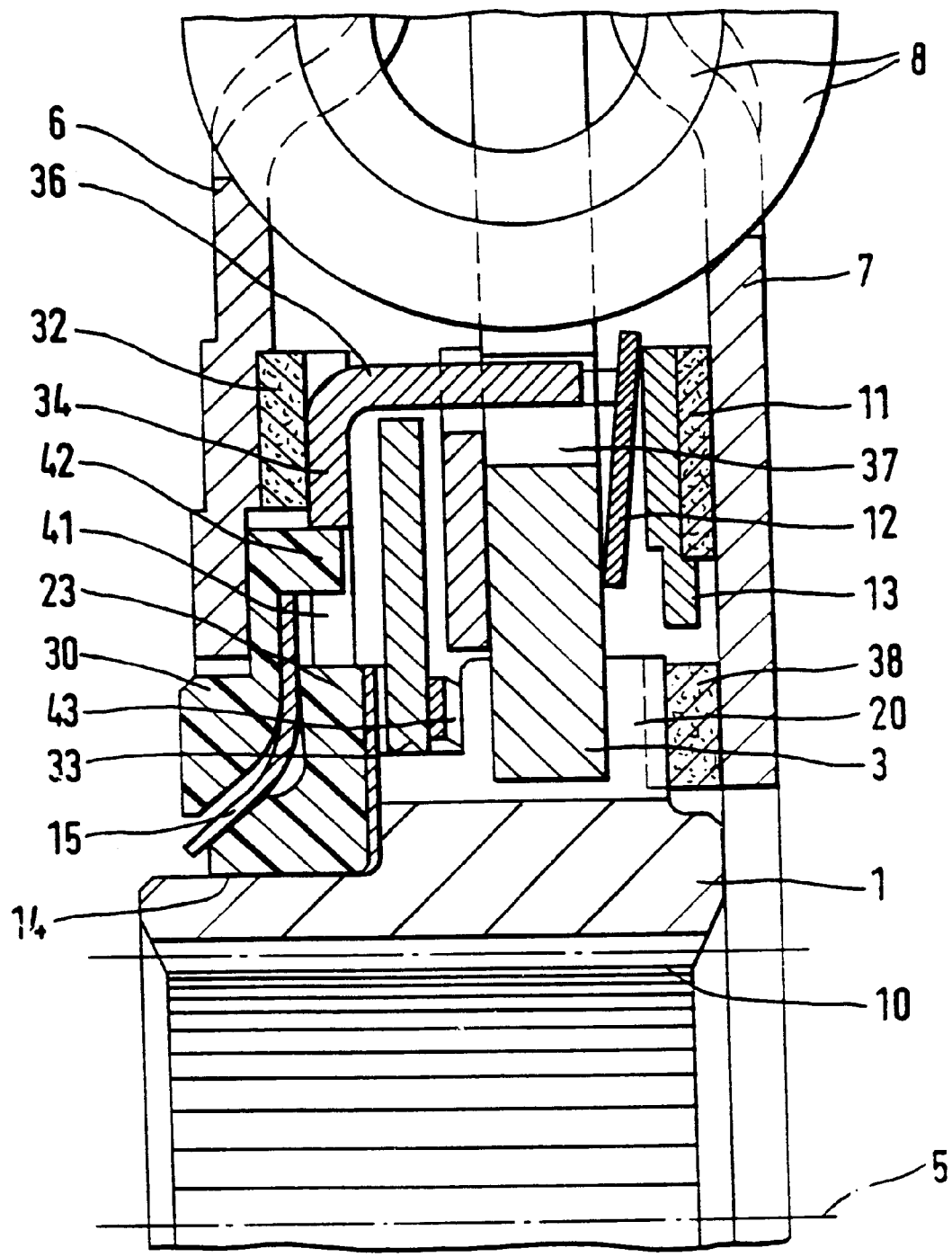
FIG. 7 shows a partial section of clutch disks with idling dampers which is a variant of FIG. 3.

FIG. 7 shows yet another embodiment of the clutch disk which, in contrast to FIG. 6, has a centering of the spring element 15 that is indirectly relative to the hub disk 3 of the load damper 52. In the present case, the plastic ring 30 at which the spring element 15 is centered, includes axially extending protuberances 42 radially outside of the centering location. The protuberances 42 engage corresponding openings 41 in the cover plate 34 of the idling damper 53 to effect a centering of the spring element 15. The friction ring 32 portion of the load friction device is arranged radially outside of these protuberances 42 and is axially clamped between the cover plate 34 and cover plate 6. The basic friction device 54 is generated independently from the load friction device 52. The spring 43, which was already described in FIG. 6, has, on the one hand, a direct support relative to the hub 1, friction ring 38, and cover plate 7. On the other hand, the spring 43 has a support via the hub disk 33 of the idling damper 53, the bearing ring 23, the annular disk-shaped region 19 of the spring element 15, the plastic ring 30, and the cover plate 6.

The spring element 15, 16 is made from sheet metal in the preferred embodiment. However, spring element 15, 16 may also be made from a material other than sheet steel. For example, it is possible depending on the load conditions to manufacture this part from plastic or as a composite part formed of different materials.

The invention is not limited by the embodiments described above which are presented as examples only but can be modified in various ways within the scope of protection defined by the appended patent claims.

We claim:

1. A clutch disk for a friction clutch in a motor vehicle, comprising:
   a hub comprising a load damper hub disk and being rotatably fixedly insertable on a gear shaft that defines a rotating axis of said hub;
   first and second cover plates surrounding said load damper hub disk and fixedly connected to each other at a position remote from hub, one of said first and second cover plates having a friction facing;
   a load damper comprising a first spring element operatively mounted between said first and second cover plates and said load damper hub disk for allowing relative rotation and providing a resilient resistance between said first and second cover plates and said hub;
   a bearing assembly operatively positioned between one of said first and second cover plates and said hub and comprising a second spring element for providing an elastically flexible connection therebetween;
   said second spring element comprising an annular disk-shaped region having an outer diameter portion and having spring tongues radially inwardly inclined and facing away from said hub disk, said spring tongues extending concentric to a substantially cylindrical bearing region of said hub, the outer diameter portion being centered without radial play with respect to one of said first and second cover plates and said hub disk;
   said bearing assembly further comprising a bearing ring having an axially outer contour and mounted between said spring tongues and said bearing region of said hub such that an axially inner contour of said spring tongues rests on said axially outer contour of said bearing ring; and
   a structural component of said one of said first and second cover plates positioned at an opposing side of said radially inwardly inclined spring tongues from said bearing ring and forming a gap between said inclined portions of said spring tongues and said structural component for limiting a radial movement of said second spring to a length of said gap.

2. The clutch disk of claim 1, wherein said second spring element is centered with respect to said one of said first and second cover plates.

3. The clutch disk of claim 2, wherein said second spring element further comprises a plurality of tongues projecting from the annular region which engage, with a centering effect, openings in said one of said first and second cover plates.

4. The clutch disk of claim 2, wherein said structural component is formed directly by a part of a radially inner region of said one of said first and second cover plates.

5. The clutch disk of claim 2, wherein said structural component comprises a plastic ring centered at said one of said first and second cover plates and positioned between an inner side of said one of said first and second cover plates and said second spring element; and
   said second spring element is centered with respect to said plastic ring.

6. The clutch disk of claim 5, wherein the plastic ring comprises a radially inner region which forms said gap with said spring tongues.

7. The clutch disk of claim 5, further comprising:
   an idling damper arranged axially between said load damper hub disk and said one of said first and second cover plates and comprising an idling hub disk rotatably fixedly connected on the hub, at least one idling cover plate centered at and axially supported at the load damper hub disk, and a third spring element arranged in windows of the idling hub disk and idling cover plate;
   a toothed connection element operatively connecting said load damper hub disk and said hub with rotational play; and
   a load friction device comprising a friction ring and a fourth spring element whose force is exerted at least over said first and second cover plates, said at least one idling cover plate, said load damper hub disk, and a portion of the friction ring.

8. The clutch disk of claim 7, wherein said friction ring comprises a portion of said plastic ring with a radial inner region.

9. The clutch disk of claim 1, wherein said second spring element is centered with respect to said load damper hub disk.

10. The clutch disk of claim 9, wherein an idling damper is arranged axially between the load damper hub disk and said one of said first and second cover plates and comprising an idling hub disk rotatably fixedly connected on said hub, at least one idling cover plate centered at and supported axially at said load damper hub disk, a third spring element mounted in windows of the idling cover plate and the idling hub disk;
   a toothed connection element operatively connecting the load damper hub disk and said hub with rotational play;
   a plastic ring positioned between an inner side of said one of said first and second cover plates and said second spring element; and said plastic ring being centered with respect to the idling cover plate and the annular disk-shaped region of the second spring element being centered with respect to the plastic ring.

11. The clutch disk of claim 10, wherein the structural component comprises a radially inner region of the plastic ring.

12. The clutch disk of claim 8, further comprising:

a basic friction device comprising a friction ring arranged between the axial front end of the toothed connection element and another one of said first and second cover plates and arranged on a side of the load damper hub disk that is remote from said idling damper; and a fourth spring generating a contact pressure force between the friction ring and the toothed connection element.

13. The clutch disk of claim 12, wherein said fourth spring is connected between said another one of said first and second cover plates and said friction ring.

14. The clutch disk of claim 12, wherein the toothed connection element of the hub is stepped in its outer diameter along an axial direction such that said toothed connection comprises a reduced diameter region and a greater diameter region and the idling hub disk is rotatably fixedly connected and axially movable at the reduced diameter region of the toothed connection element and wherein said fourth spring element is mounted at the reduced diameter region of the toothed connection and axially guided between said idling hub disk and the greater diameter region of the toothed connection element.

* * * * *